United States Patent
Miyoshi et al.

(10) Patent No.: US 8,353,798 B2
(45) Date of Patent: Jan. 15, 2013

(54) GEAR TRANSMISSION

(75) Inventors: Hiroyuki Miyoshi, Tsu (JP); Shigehisa Muraki, Tsu (JP)

(73) Assignee: Nabtesco Corporation, Tokyo (JP)

( * ) Notice: Subject to any disclaimer, the term of this patent is extended or adjusted under 35 U.S.C. 154(b) by 304 days.

(21) Appl. No.: 12/866,097

(22) PCT Filed: Jan. 22, 2009

(86) PCT No.: PCT/JP2009/050954
§ 371 (c)(1),
(2), (4) Date: Aug. 4, 2010

(87) PCT Pub. No.: WO2009/098945
PCT Pub. Date: Aug. 13, 2009

(65) Prior Publication Data
US 2011/0028259 A1    Feb. 3, 2011

(30) Foreign Application Priority Data
Feb. 7, 2008  (JP) ................................ 2008-028068

(51) Int. Cl.
*F16H 1/32* (2006.01)
(52) U.S. Cl. ........................................................ 475/168
(58) Field of Classification Search .................. 475/168, 475/179
See application file for complete search history.

(56) References Cited

U.S. PATENT DOCUMENTS

| | | | |
|---|---|---|---|
| 4,909,102 A | 3/1990 | Haga | |
| 5,161,290 A | 11/1992 | Hashimoto et al. | |
| 8,029,400 B2* | 10/2011 | Nakamura | 475/162 |
| 8,096,911 B2* | 1/2012 | Miyoshi | 475/178 |
| 8,100,807 B2* | 1/2012 | Miyoshi et al. | 475/178 |
| 2008/0295623 A1 | 12/2008 | Kurita et al. | |
| 2009/0124446 A1 | 5/2009 | Miyoshi | |
| 2010/0004086 A1 | 1/2010 | Miyoshi et al. | |
| 2010/0179013 A1* | 7/2010 | Nakamura | 475/179 |
| 2011/0275469 A1* | 11/2011 | Miyoshi et al. | 475/162 |

FOREIGN PATENT DOCUMENTS

| | | |
|---|---|---|
| EP | 0 291 052 A2 | 11/1988 |
| EP | 0 449 460 A1 | 10/1991 |
| JP | 1-169154 A | 7/1989 |
| JP | 2-150189 U | 12/1990 |
| JP | 7-301287 A | 11/1995 |
| JP | 2006-77980 A | 3/2006 |
| JP | 2007-247730 A | 9/2007 |

OTHER PUBLICATIONS

Written Opinion from parent PCT application No. PCT/JP2009/050954.
Extended European Search Report dated Apr. 27, 2011 for counterpart European patent application No. 09708730.8, including Communication, European Search Opinion, Supplementary European Search Report and claims 1-5 as searched and examined.
Communication from European Patent Office dated May 30, 2012 for counterpart European patent application No. 09 708 730.8, including Communication, Examination Report (Annex), claims 1-5 as examined and arguments submitted Nov. 8, 2011 with claims 1-5.
International Search Report for parent PCT appication No. PCT/JP2009/050954.
Office Action from Chinese Patent Office dated Aug. 14, 2012 for counterpart Chinese patent application No. 200980104297.3, including English translation of substantive portion of the Office Action.

* cited by examiner

*Primary Examiner* — Dirk Wright
(74) *Attorney, Agent, or Firm* — J-Tek Law PLLC; Jeffrey D. Tekanic

(57) ABSTRACT

A gear transmission comprises an internal gear member, a carrier, an external gear and a first shaft. An internal gear is formed on an inner circumference of the internal gear member. The carrier is positioned coaxially with an axis of the internal gear and is rotatably supported on the internal gear member. The external gear meshes with the internal gear and is supported on the carrier in an eccentrically rotatable manner. The first shaft extends through the carrier along the axis of the internal gear, is rotatably supported on the carrier and transmits torque inputted at one end to the other end thereof.

21 Claims, 6 Drawing Sheets

GEAR TRANSMISSION

CROSS-REFERENCE

This application is the US national stage of International Patent Application No. PCT/JP2009/050954 filed on Jan. 22, 2009, which claims priority to Japanese Patent Application No. 2008-28068 filed on Feb. 7, 2008, the contents of which are hereby incorporated by reference into the present specification.

TECHNICAL FIELD

The present application relates to a gear transmission. For example, a gear transmission suitable for driving a joint of a multi-joint robot is disclosed.

BACKGROUND ART

A gear transmission suitable for driving a joint of a multi joint robot is taught in Japanese Patent Application Publication H01-169154 (Patent Document 1). The gear transmission of Patent Document 1 comprises an internal gear member and a carrier. An internal gear is formed on an inner circumference of the internal gear member. The carrier is positioned coaxially with an axis of the internal gear and is rotatably supported on the internal gear member. An external gear meshing with the internal gear is supported on the carrier in an eccentrically rotatable manner. The internal gear and the external gear have a different number of teeth. The external gear rotates eccentrically around the axis of the internal gear while remaining meshed with the internal gear. At this time, the external gear rotates relative to the internal gear in accordance with the difference in the number of teeth of the external gear and the internal gear. When the external gear rotates relative to the internal gear, the carrier supporting the external gear rotates relative to the internal gear. This gear transmission achieves a gear reduction ratio in accordance with the difference in the number of teeth of the external gear and the internal gear.

The gear transmission of Patent Document 1 drives the joint of the multi joint robot. Consequently, the gear transmission of Patent Document 1 rotates a member, which is positioned closer to a robot tip side than the joint, relative to a member positioned closer to a robot base-side than the joint. In the multi joint robot, a plurality of joints is arranged from its base to its tip. A motor is required to drive a joint. If the motor is positioned in the vicinity of each joint, the tip of the robot becomes heavy. Accordingly, a configuration may be employed in which the motors are positioned as close to the robot base as possible, and each of the joints is connected with the respective motors by a torque transmission member such as a shaft, etc.

In the gear transmission of Patent Document 1, a through-hole extending through the carrier is formed along the axis of the internal gear. The shaft is passed through this through-hole, and torque can be transmitted from the motor, which is positioned closer to the robot base-side than the gear transmission, to the joint which is positioned closer to the robot tip side than the gear transmission. Therefore, the motor, which drives the joint positioned closer to the robot tip side than the gear transmission, can be positioned closer to the robot base-side than the gear transmission. The weight of the robot tip can thereby be reduced.

SUMMARY OF INVENTION

In case a multi joint robot will be assembled utilizing the gear transmission of Patent Document 1, a first task of engaging an output shaft of the motor with one end the shaft, which passes through the carrier, must be performed simultaneously with a second task of engaging the joint (or the gear transmission for that joint) with the other end of that shaft, wherein the joint is located closer to the robot tip side than the gear transmission. Consequently, in case a shaft will be attached to the multi joint robot, the tasks must be performed at both ends of the shaft in a coordinated manner. Alternatively, the shaft may be passed through the through-hole of the carrier while the shaft is being engaged with the joint at the robot tip side and then, the shaft must be subsequently engaged with the motor. In this case as well, since the shaft passes through the gear transmission, performing the tasks at both ends of the gear transmission is burdensome. The techniques taught herein have been created taking the above problem into consideration, and offer, in certain embodiments, a gear transmission that simplifies the assembly of a multi joint robot.

A gear transmission taught herein may generally comprise an internal gear member having an internal gear formed on its inner circumference, a carrier positioned coaxially with an axis of the internal gear and rotatably supported on the internal gear member, and an external gear meshing with the internal gear and supported on the carrier in an eccentrically rotatable manner. A through-hole is formed in the carrier and extends along the axis of the internal gear. In addition, a first shaft extends through the carrier and is rotatably supported on the carrier. The first shaft transmits a drive torque inputted at one end to its other end. In such an embodiment, the first shaft, which passes through the carrier and transmits drive torque, may be installed before it is attached to the robot. When this gear transmission is attached to a robot arm, the position of the first shaft is fixed with respect to the arm. Consequently, the first task for engaging one end of the first shaft (the robot base-side end) with a motor and the second task for engaging the other end of the first shaft with a joint, which is positioned closer to the robot tip side than the gear transmission, can be performed independently. The assembly of the multi joint robot is thus made easier.

Two joints may be positioned closer to the robot tip side than the gear transmission. In this case, the gear transmission may comprise a second shaft extending through an interior of the first shaft coaxially with the first shaft. In such a gear transmission, two motors can be positioned closer to the robot base-side than the gear transmission. The torques of the two motors are transmitted to the respective two joints that are closer to the robot tip side than the gear transmission. With this gear transmission, the multi joint robot, in which the two joints are positioned closer to the robot tip side than the gear transmission, can be assembled efficiently.

In an embodiment, in which the second shaft extends through the interior of the first shaft, the second shaft is surrounded by the first shaft. Consequently, it may not be easy to engage the motor or the joint with the second shaft. However, if the length of the second shaft is made longer than the length of the first shaft, the second shaft will protrude from an end face of the first shaft. As a result, it will be easier to engage the motor or the joint with the second shaft. The assembly of the multi joint robot is thus made easier.

The gear transmission taught herein is preferably employed in a multi joint robot wherein a wrist is connected to a tip of a lower arm. Consequently, the gear transmission is suitable for a gear transmission attached to the lower arm of the multi joint robot for rotating the wrist of the multi joint robot around an axis of the lower arm. In such a gear transmission, a first gear that will engage with a first motor is preferably affixed to a robot base-side end of the first shaft and a second gear that will engage with a second motor is preferably affixed to a robot base-side end of the second shaft. The first shaft detachably connects to a first drive shaft at a robot tip-side end of the first shaft, and the second shaft detachably connects to a second drive shaft at a robot tip-side end of the second shaft. The first and second drive shafts transmit torque to respective first and second joints arranged at a tip side of the lower arm. If this gear transmission is utilized, the first task for engaging the first and second shafts with the two motors for driving the wrist joint can be performed independently of the second task for engaging the first and second shafts with two drive shafts for transmitting torques to the wrist joint.

According to the techniques taught in the present specification, a gear transmission can be provided, in which the assembly of a multi joint robot is simplified.

DESCRIPTION OF EMBODIMENTS

Before describing the embodiments, several technical features of the embodiments will be noted briefly below. The principle technical features are included in the descriptions of the embodiments.

(First feature) The carrier comprises a pair of support members and a column-shaped part extending alongside the axis of the internal gear, the support members being connected at the column-shaped part.

(Second feature) A first through-hole extending along the axis of the internal gear is formed in the carrier, and a first shaft is rotatably supported on the carrier within the first through-hole.

(Third feature) A second through-hole, into which an eccentric body of a crankshaft fits, and a third through-hole, into which the column-shaped part of the carrier fits, are formed in the external gear.

(Fourth feature) A fourth through-hole is formed in the first shaft coaxially with an axis of the first shaft, and a second shaft is rotatably supported on the first shaft within the fourth through-hole.

First Embodiment

Figure 1:
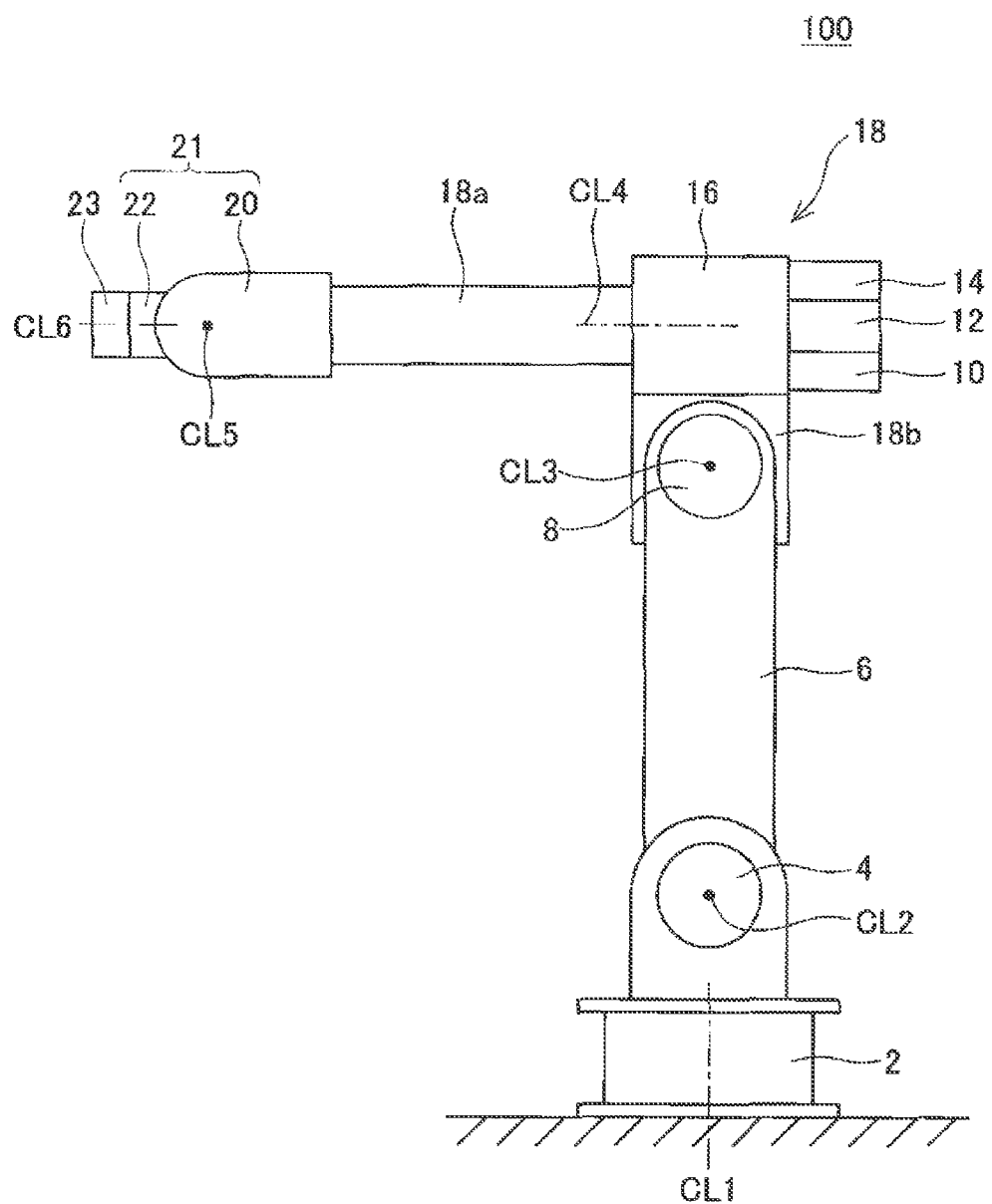
FIG. 1 shows a schematic view of a multi joint robot.
Figure 2:
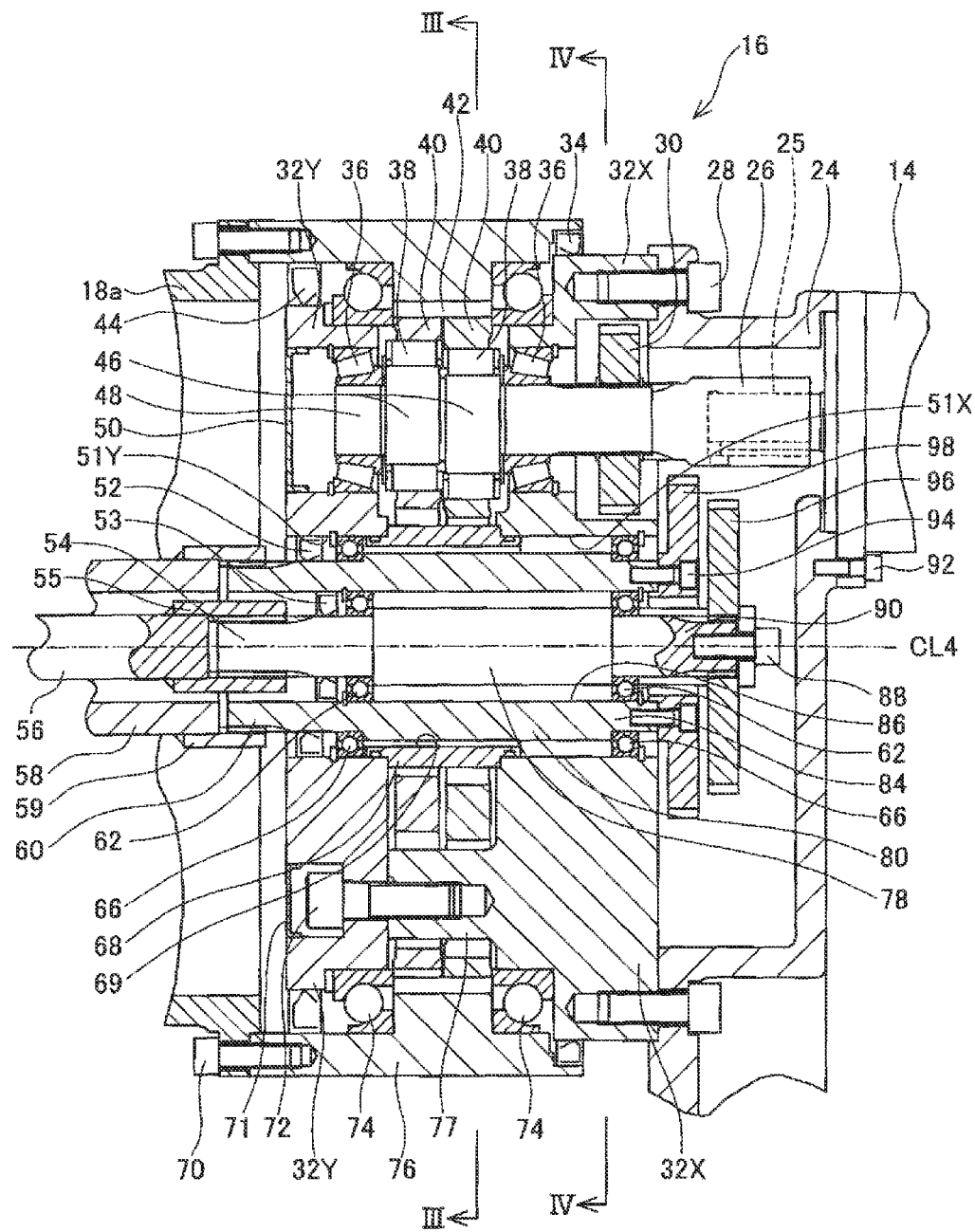
FIG. 2 shows a cross-sectional view of a gear transmission of a first embodiment.
Figure 3:
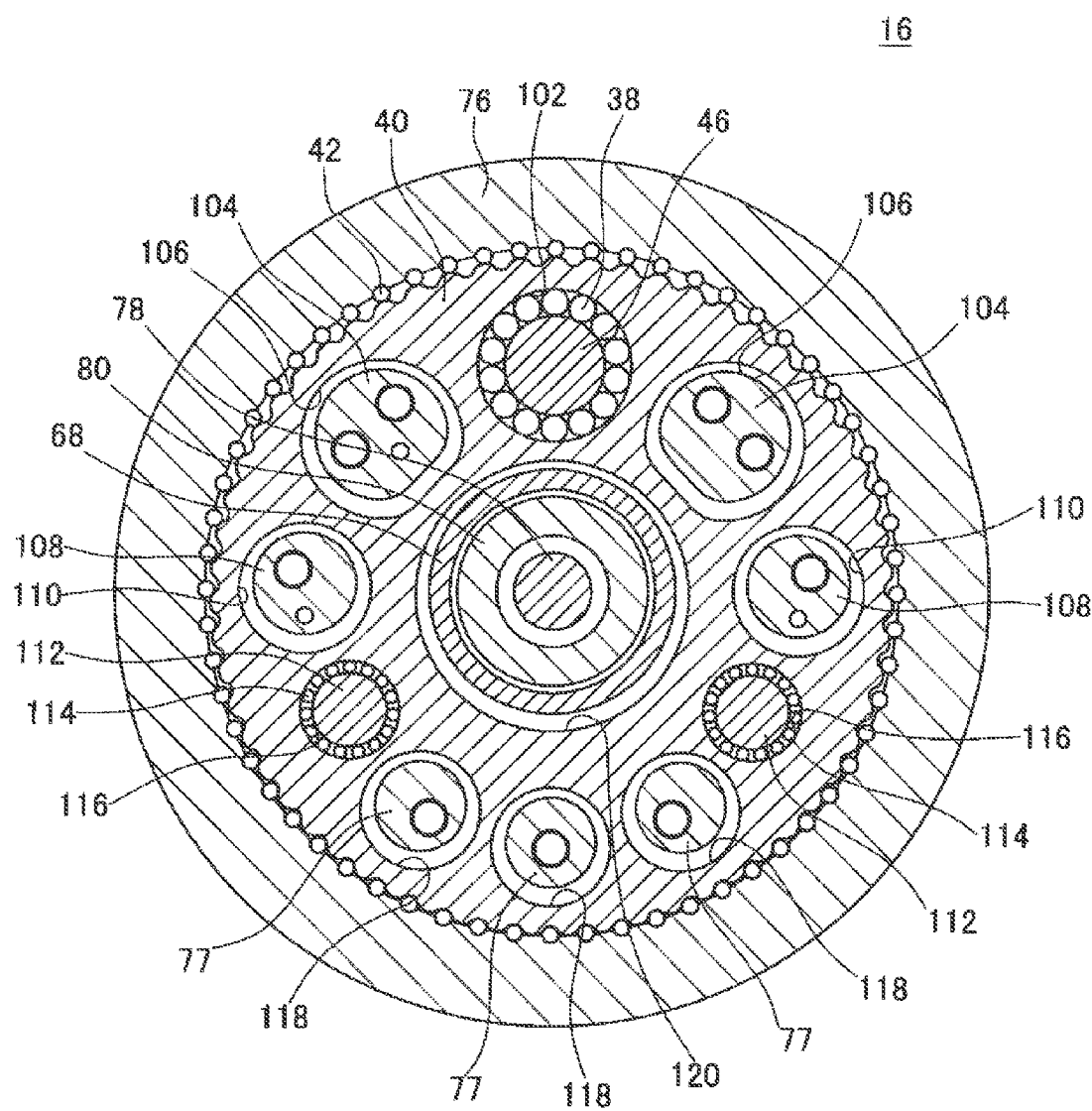
FIG. 3 shows a cross-sectional view along line III-III of FIG. 2.
Figure 4:
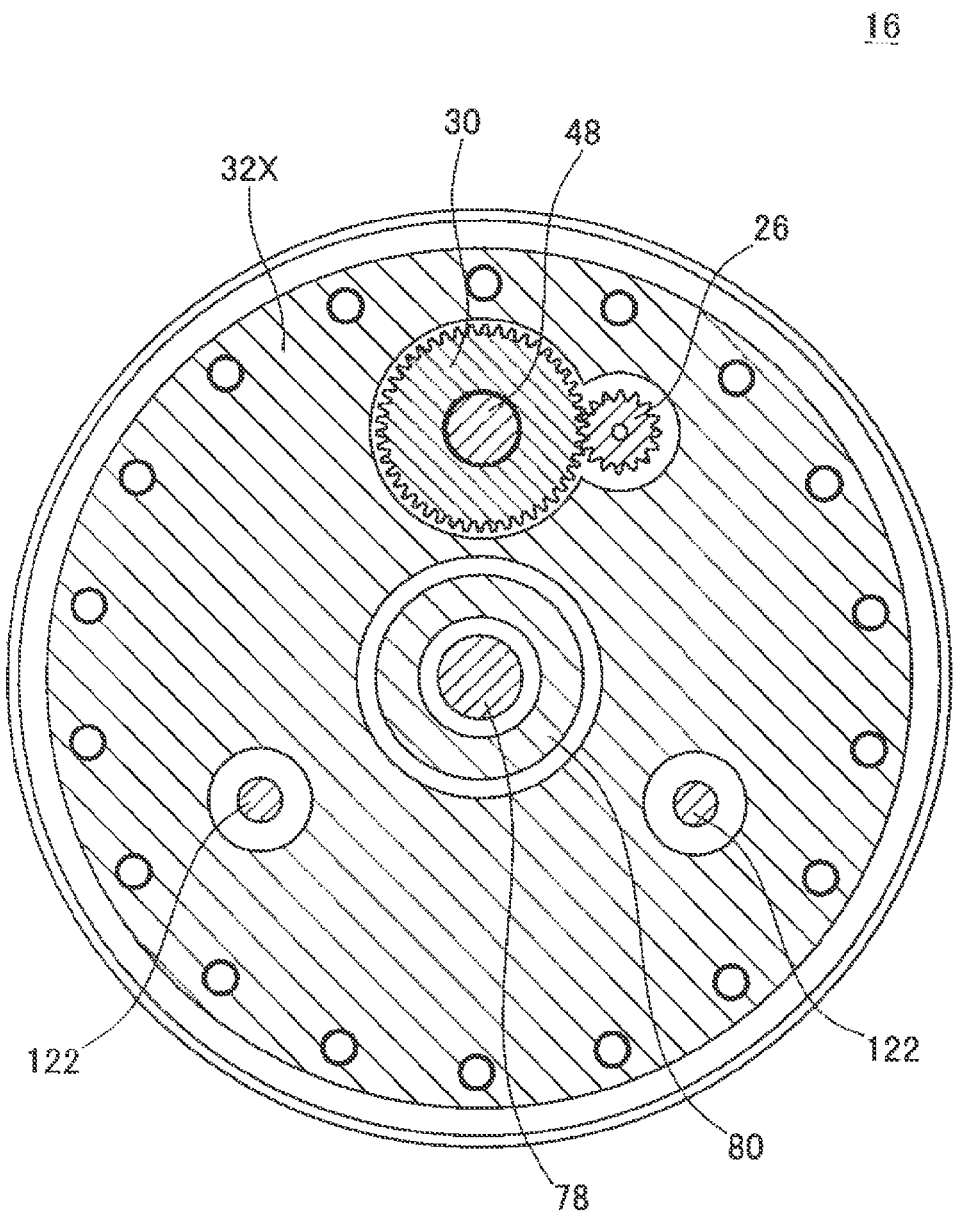
FIG. 4 shows a cross-sectional view along line IV-IV of FIG. 2.

FIG. 1 shows a schematic view of a multi joint robot 100, to which a gear transmission 16 of the present embodiment is attached. FIG. 2 shows a cross-sectional view of the gear transmission 16. FIG. 3 shows a cross-sectional view along the line III-III of FIG. 2. FIG. 4 shows a cross-sectional view along the line IV-IV of FIG. 2. In order to simplify the figures, the cross-hatchings of some of the components are omitted in the cross-sectional views.

First, the multi joint robot 100 will be described. The multi joint robot 100 comprises a base-side arm (upper arm) 6 that rotates with respect to a base and a tip-side arm (lower arm) 18 that rotates with respect to the base-side arm 6. The multi joint robot 100 further comprises parts such as a hand 23, etc. The multi joint robot 100 comprises six joints 2, 4, 8, 16, 20 and 22. A gear transmission is installed at each of the joints. Motor torque is amplified by the gear transmissions and drives the joints. In the following description, reference numbers indicating the joints are also utilized as the reference numbers indicating the gear transmission provided at the joint. For example, the gear transmission installed at the joint 2 will be expressed as "gear transmission 2". Further, the joints 20 and 22 together may be called a wrist 21.

The gear transmission 2 rotates the entire multi-joint robot 100, with respect to the base, around an axis CL1. The gear transmission 4 rotates the base-side arm 6 around an axis CL2. The gear transmission 8 rotates the tip-side arm 18 around an axis CL3. The gear transmission 16 rotates the wrist 21 around an axis CL4. The gear transmission 20 rotates the hand 23 around an axis CL5. The gear transmission 22 rotates the hand 23 around an axis CL6. Moreover, when the wrist 21 is rotated around the axis CL4 by the gear transmission 16, an arm part 18a of the tip-side arm 18 rotates together with the wrist 21 around the axis CL4.

A motor 14 transmits torque to the gear transmission 16. A motor 12 transmits torque to the gear transmission 22. A motor 10 transmits torque to the gear transmission 20. The motors 10, 12 are arranged at a position spaced from the gear transmissions 20, 22. More specifically, the motors 10, 12 are arranged closer to the base-side than the gear transmission 16, and transmit torque to the gear transmissions 20, 22 arranged closer to the tip side of the arm than the gear transmission 16. Although this will be further described below, the motors 10, 12 transmit torque to the gear transmissions 20, 22 via shafts extending within the gear transmission 16. Moreover, in FIG. 1, the illustrations of the motors for driving the gear transmissions 2, 4, 8 are omitted.

The gear transmission 16, which will be described in detail below, is installed between a base part 18b and the arm part 18a of the tip-side arm 18 and is a gear transmission that rotates the wrist 21 around the axis CL4 of the tip-side arm 18. The other gear transmissions 2, 4, 8, 20 and 22 may also have the same configuration as the gear transmission 16. Further, the base part 18b of the tip-side arm 18 is installed at an output side of the gear transmission 8.

As shown in FIG. 2, the gear transmission 16 comprises an internal gear member 76 and a carrier. Internal gear pins 42 are provided at an inner circumference of the internal gear member 76. The plurality of internal gear pins 42 is provided at the inner circumference of the internal gear member 76, forming an internal gear (see FIG. 3). The carrier comprises a pair of opposing support members 32X, 32Y and a column-shaped part 77 extending alongside the axis CL4 of the internal gear. The support member 32X and the support member 32Y are connected at the column-shaped part 77. Specifically, the support member 32X and the column-shaped part 77 are formed integrally, and the support member 32Y and the column-shaped part 77 are affixed via a bolt 72. In the description below, the pair of support members 32X, 32Y together with the column-shaped part 77 may be called a carrier 32.

The carrier 32 is rotatably supported on the internal gear member 76 by a pair of angular ball bearings 74. The carrier 32 is positioned coaxially with the axis CL4 of the internal gear. Through-holes (first through-holes) 51X, 51Y are respectively formed in the support members 32X, 32Y. The first through-holes 51X, 51Y are formed coaxially with the axis CL4 of the internal gear. In the description below, the first through-hole 51X and first through-hole 51Y together may be called a first through-hole 51.

The carrier 32 supports a crankshaft 48 and external gears 40. The crankshaft 48 is positioned between the pair of support members 32X, 32Y and is rotatably supported on the carrier 32 by a pair of tapered roller bearings 36. The crankshaft 48 extends alongside the axis CL4 of the internal gear. Eccentric bodies 46 and an input gear 30 are affixed to the crankshaft 48. Moreover, the input gear 30 meshes with a motor gear 26 affixed to an output shaft 25 of the motor 14 (see also FIG. 4). That is, the crankshaft 48 serves as an input shaft of the gear transmission 16 at a position offset in the radial direction from the axis CL4.

As shown in FIG. 4, the number of teeth of the input gear 30 is greater than the number of teeth of the motor gear 26. Consequently, the rotation of the output shaft 25 of the motor 14 is decelerated by the gears 26, 30 and transmitted to the crankshaft 48. When the crankshaft 48 rotates, the eccentric body 46 rotates eccentrically around the axis of the crankshaft 48.

As shown in FIGS. 2, 3, the external gear 40 is surrounded by the internal gear member 76 and meshes with the internal gear (the internal gear pins 42). Through-holes (second through-holes) 102, 116 are formed in the external gear 40. Each of the eccentric bodies 46 of the crankshaft 48 is fitted into a corresponding second through-hole 102 via a needle roller bearing 38. In addition to the aforementioned crankshaft 48, auxiliary crankshafts 122 are rotatably supported between the pair of support members 32X, 32Y (see FIG. 4). An eccentric body 112 is affixed to each of the auxiliary crankshafts 122. Each of the eccentric bodies 112 of the auxiliary crankshafts 122 is fitted into a corresponding second through-hole 116 via a needle roller bearing 114. When the crankshaft 48 rotates, the eccentric body 46 rotates eccentrically around the axis of the crankshaft 48. Similarly, when the auxiliary crankshaft 122 rotates, the eccentric body 112 rotates eccentrically around an axis of the auxiliary crankshaft 122. Consequently, following the rotation of the crankshaft 48, the external gear 40 rotates eccentrically around the axis CL4 while maintaining a meshed engagement with the internal gear (the internal gear pins 42). When the external gear 40 makes one eccentric rotation, the external gear 40 will rotate relative to the internal gear member 76 in accordance with the difference in the number of teeth of the external gear 40 and the internal gear (the number of internal gear pins 42).

Moreover, as shown in FIG. 4, an input gear is not affixed to each of the auxiliary crankshafts 122. Consequently, the torque of the motor 14 is not transmitted directly to the auxiliary crankshafts 122. In fact, the auxiliary crankshafts 122 do not eccentrically rotate the external gear 40. The crankshaft 48 eccentrically rotates the external gear 40 and consequently, the auxiliary crankshafts 122 rotate passively following the eccentric rotation of the external gear 40. The rotational balance of the external gear 40 is stabilized by providing the auxiliary crankshafts 122. In other words, the auxiliary crankshafts 122 rotate in synchrony with the crankshaft 48 and cause the external gear 40 to rotate stably.

As shown in FIG. 3, through-holes (third through-holes) 106, 110 and 118 are formed in the external gear 40. The column-shaped parts 77 of the carrier 32 (see also FIG. 2) fit loosely into the third through-holes 118. The reference numbers 104, 108 indicate column-shaped parts of the carrier 32. The column-shaped parts 104 fit loosely into the third through-holes 106 and the column-shaped parts 108 fit loosely into the third through-holes 110. The term of "fits loosely" in the present specification means two members are fitted with a clearance therebetween. Therefore, clearances are provided between the column-shaped parts 77, 104, 108 and the inner surfaces of the corresponding third through-holes 118, 106, 110. These clearances allow the eccentric rotation of the external gear 40. When the external gear 40 rotates with respect to the internal gear 76, the carrier 32 rotates with respect to the internal gear member 76 following the rotation of the external gear 40.

As shown in FIG. 2, the motor 14 is affixed to a motor support member 24 via a bolt 92. The motor support member 24 is affixed to the carrier 32 via a bolt 28. Therefore, the motor 14 is affixed to the carrier 32. Consequently, when the crankshaft 48 rotates, the carrier 32 does not rotate with respect to the motor 14 (or the motor support member 24). When the crankshaft 48 rotates, the internal gear member 76 rotates with respect to the motor 14. On the other hand, the arm part 18a of the tip-side arm 18 is affixed to the internal gear member 76 via a bolt 70. When the crankshaft 48 rotates, the arm part 18a rotates relative to the motor support member 24. That is, when the crankshaft 48 rotates, the wrist 21 rotates around the axis CL4 (see FIG. 1). Although not shown, the motor 10 and the motor 12 are affixed to the motor support member 24.

A cylindrical member 68 having a through-hole 69 is positioned between the support member 32X and the support member 32Y. The through-hole 69 communicates with the first through-hole 51 (through-holes 51X and 51Y). Moreover, the cylindrical member 68 passes through a center through-hole 120 (see FIG. 3) formed in the external gear 40. A first shaft 80 is positioned within the through-holes 51, 69. The first shaft 80 is positioned coaxially with the axis CL4 of the internal gear. The first shaft 80 is rotatably supported on the carrier 32 by a pair of deep groove ball bearings 66. Further, the first shaft 80 protrudes from an end face of the support member 32Y and an end face of the internal gear member 76.

An input gear 98 is affixed to an end 84 of the first shaft 80 via a bolt 94. The input gear 98 meshes with a motor gear (not shown) affixed to an output shaft of the motor 10 (see FIG. 1). A drive shaft 58 is connected with an end 60 of the first shaft 80 by a connecting member 59. Moreover, the first shaft 80 is detachable from the drive shaft 58. The drive shaft 58 transmits the torque of the motor 10 to an input shaft (not shown) of the gear transmission 20 (see FIG. 1). In other words, the drive shaft 58 transmits the torque of the motor 10 to a joint closer to the tip than the tip-side arm 18. The torque of the motor 10 is transmitted to the input shaft of the gear transmission 20 via the input gear 98, the first shaft 80, and the drive shaft 58.

As described above, the first shaft 80 is supported on the carrier 32. Consequently, the task of engaging the motor 10 with the end 84 of the first shaft 80 (i.e., the task of fixing the input gear 98 to the end 84 and the task of meshing the input gear 98 with a motor gear of the motor 10) and the task of connecting the drive shaft 58 with the end 60 of the first shaft 80 can be performed independently. It is not necessary to perform the tasks in a coordinated manner at both ends of the gear transmission 16 as in known gear transmissions. The gear transmission 16 can simplify the assembly of the multi joint robot 100 as compared to known gear transmissions.

A through-hole (fourth through-hole) 86 is formed in the first shaft 80 coaxially with the axis CL4. Moreover, since the first shaft 80 is positioned coaxially with the axis CL4, the fourth through-hole 86 can be said to be formed coaxially with the axis of the first shaft 80. A second shaft 78 passes through the fourth through-hole 86. The second shaft 78 is rotatably supported on the first shaft 80 by a pair of deep groove ball bearings 62. As described above, the first shaft 80 is rotatably supported on the carrier 32. Consequently, the second shaft 78 can be said to be rotatably supported on the carrier 32 via the first shaft 80. An input gear 96 is affixed to an end 90 of the second shaft 78 via a bolt 88. A drive shaft 56 is connected with an end 54 of the second shaft 78 by a connecting member 55. The second shaft 78 is detachable from the drive shaft 56. The drive shaft 56 transmits the torque of the motor 12 to an input shaft of the gear transmission 22 (see FIG. 1). Since the second shaft 78 is rotatably supported on the carrier 32, the task of engaging the motor 12 with the end 90 of the second shaft 78 (i.e., the task of fixing the input gear 96 to the end 90 and the task of meshing the input gear 96 with a motor gear of the motor 12) and the task of connecting the drive shaft 56 with the end 54 of the second shaft 78 can be performed independently.

Figure 5:
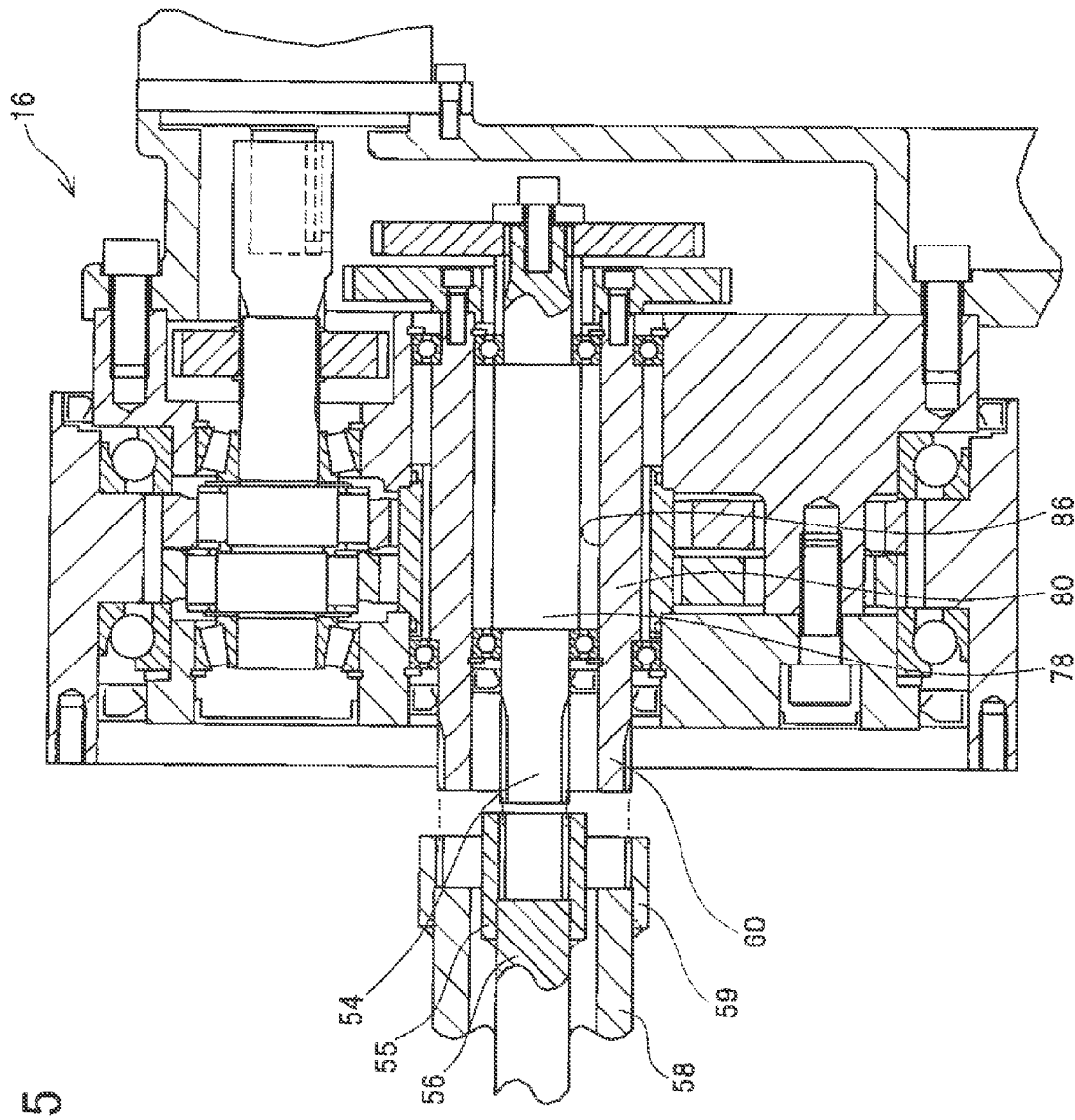
FIG. 5 shows a diagram explaining the act of attaching the gear transmission of the first embodiment.

As shown in FIG. 2, the second shaft 78 is longer than the first shaft 80. The end 54 of the second shaft 78 protrudes from an end face of the first shaft 80. Consequently, the task of connecting the first shaft 80 with the drive shaft 58 and the task of connecting the second shaft 78 task the drive shaft 56 can be simplified. This will be explained with reference to FIG. 5. In FIG. 5, only the components required for the following description have reference numbers appended thereto.

As was described above, the first shaft 80 and the drive shaft 58 are connected by the connecting member 59. The second shaft 78 and the drive shaft 56 are connected by the connecting member 55. Since the second shaft 78 is positioned within the fourth through-hole 86, external confirmation can not be performed. However, since the end 54 of the second shaft 78 protrudes from the end face of the first shaft 80, it can be easily confirmed whether the second shaft 78 and the drive shaft 56 are properly connected. Further, the second shaft 78 and the drive shaft 56 can be connected without being hindered by the first shaft 80. As described above, the first shaft 80 protrudes from the end face of the support member 32Y and the end face of the internal gear member 76. It can easily be confirmed whether the first shaft 80 and the drive shaft 58 are properly connected. Further, the first shaft 80 and the drive shaft 58 can be connected without being hindered by the support member 32Y or the internal gear member 76.

Other components of the gear transmission 16 will be described. As shown in FIG. 2, an oil seal 44 is positioned between the internal gear member 76 and the support member 32Y. An oil seal 34 is positioned between the internal gear member 76 and the support member 32X. An oil seal 52 is positioned between the support member 32Y and the first shaft 80. An oil seal 53 is positioned between the first shaft 80 and the second shaft 78. Further, caps 50, 71 are positioned at the end face of the support member 32Y. The cap 50 partitions the crankshaft 48 from the exterior of the gear transmission 16. The cap 71 partitions the bolt 72 from the exterior of the gear transmission 16. Lubricant (oil) within the gear transmission 16 can be prevented from leaking externally by the four oil seals 44, 34, 52, 53 and the caps 50, 71.

Second Embodiment

Figure 6:
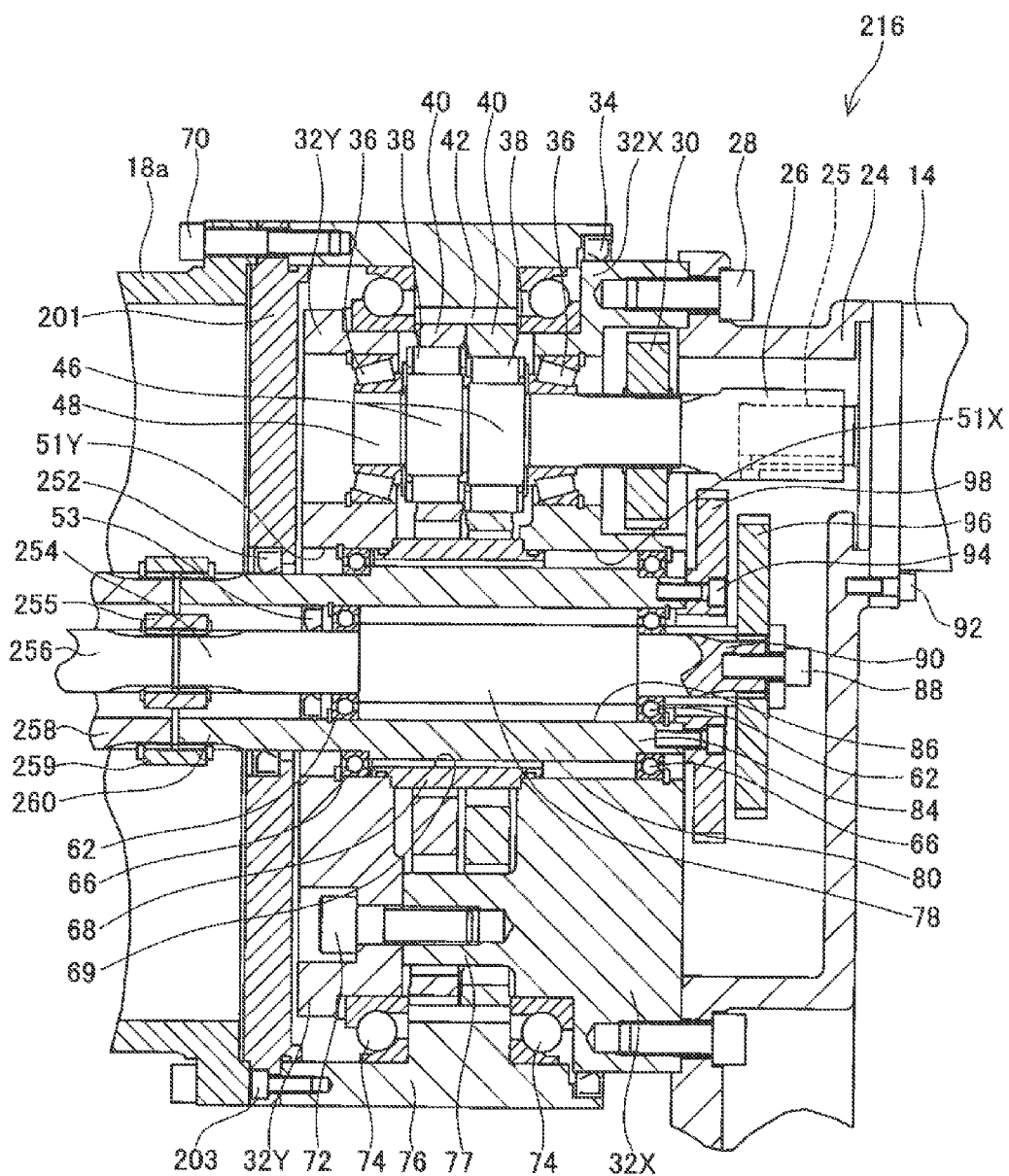
FIG. 6 shows a cross-sectional view of a gear transmission of a second embodiment.

A gear transmission 216 will be described with reference to FIG. 6. The gear transmission 216 is a modified example of the gear transmission 16. The same reference numbers or reference numbers having the same two lower digits will be applied to components that are substantially identical to those in the gear transmission 16, and explanations thereof will be omitted.

A cover 201 is affixed to the internal gear member 76 by a bolt 203. A through-hole is formed in the cover 201, and the first shaft 80 passes through this through-hole. An oil seal 252 is positioned between the cover 201 and the first shaft 80. The oil seals 44, 52 and caps 50, 71, which were utilized in the gear transmission 16, are not utilized in the gear transmission 216. In the gear transmission 216, lubricant within the gear transmission 216 can be prevented from leaking externally by the three oil seals 34, 252, 53 and the cover 201. Therefore, the gear transmission 216 makes possible a reduction of the number of components as compared to the gear transmission 16. Further, an end 254 of the second shaft 78 does not protrude from the end face of the first shaft 80. Consequently, the gear transmission 216 has fewer projections and the unevenness of the outer shape is less than the gear transmission 16. It makes possible an increase in safety during the assembly of the robot.

In the gear transmissions 16, 216, the crankshaft 48 extends alongside the axis CL4 of the internal gear at a position offset from the axis CL4 of the internal gear. Consequently, the second through-holes 102, 116 of the external gear 40 are formed in the circumferential direction of the external gear 40. The crankshaft 48 may extend coaxially with the axis CL4 of the internal gear. In this case, the second through-holes of the external gear 40 may be formed in the center of the external gear. The auxiliary crankshaft 122 (see FIG. 4) can be omitted. Consequently, the number of components of the gear transmission can be reduced. In this case, a through-hole is formed in the crankshaft 48, and the first shaft 80 is positioned in that through-hole.

In the gear transmissions 16, 216, the motor gear 26 meshes directly with the input gear 30 affixed to the crankshaft 48, and the torque of the motor 14 is transmitted to the crankshaft 48. A gear may be positioned between the motor gear 26 and the input gear 30, and the torque may be transmitted via that gear. In this case, it is preferred that the gear positioned between the motor gear 26 and the input gear 30 is rotatably supported on the carrier 32. Further, in the gear transmissions 16, 216, the torque of the motor 14 is transmitted directly to only the crankshaft 48, and the auxiliary crankshaft 122 passively rotates following the eccentric rotation of the external gear 40. However, a gear may be rotatably supported on the carrier 32, and the torque of the motor gear 26 may be transmitted uniformly via the gear to all the crankshafts. The torque transmission path of the gear transmission is not limited to these examples, but can be changed appropriately according to the embodiment.

In the gear transmissions 16, 216, the first through-hole 51 of the carrier 32 is formed coaxially with the axis CL4 of the internal gear. However, the first through-hole 51 may be formed alongside the axis CL4 at a position offset from the axis CL4. In this case, the first shaft 80 and the second shaft 78 are formed alongside the axis CL4 at a position offset from the axis CL4. That is, the positions at which the shafts 80, 78 pass through the carrier 32 can be arbitrarily determined and can be changed appropriately according to other factors (e.g., diameter of the crankshaft, position of the crankshaft, etc.).

In the gear transmission 216, the end 254 of the second shaft 78 does not protrude from the end face of the first shaft 80. As in the case of the gear transmission 16, the end 254 of the second shaft 78 may protrude from the end face of the first shaft 80. The task of connecting the first shaft 80 with a drive shaft 258 and the task of connecting the second shaft 78 with a drive shaft 256 can be simplified.

Specific examples of the present invention are described above in detail, but these examples are merely illustrative and do not limit the scope of the patent claims. The technology mentioned in the patent claims also encompasses various changes and modifications to the specific examples described above. The technical elements explained in the present specification and drawings provide practical utility either independently or through various combinations. The present invention is not limited to the combinations described at the time the claims are filed. Further, the purpose of the examples illustrated by the present specification and drawings is to satisfy multiple objectives simultaneously, and satisfying any one of those objectives gives practical utility to the present invention.

The invention claimed is:

1. A gear transmission configured to be connected to a lower arm of a multi joint robot and to rotate a wrist of the multi-joint robot about a rotational axis of the lower arm, the gear transmission comprising:
   an internal gear member having an internal gear formed on its inner circumference;
   a carrier positioned coaxially with a central axis of the internal gear and being rotatably supported on the internal gear member;
   an external gear meshing with the internal gear and being supported on the carrier in an eccentrically rotatable manner;
   a first shaft extending through the carrier along the central axis of the internal gear and being rotatably borne on the carrier so as to be rotatable independent of the internal gear, the external gear and the carrier, the first shaft being configured to transmit a drive torque inputted by a first motor at one axial end of the first shaft to its other axial end, which is configured to be coupled to an input shaft of another gear transmission;
   a second shaft extending through an interior of the first shaft coaxially with the first shaft and rotatably supported on the first shaft via bearings;
   a first gear affixed at a robot base-side end of the first shaft, the first gear being configured to be mechanically coupled to the first motor, and
   a second gear affixed at a robot base-side end of the second shaft, the second gear being configured to be mechanically coupled to a second motor,
   wherein the first shaft is detachably connected to a first drive shaft at a robot tip-side end of the first shaft, the second shaft is detachably connected to a second drive shaft at a robot tip-side end of the second shaft, and the first and second drive shafts are configured to transmit respective torques to respective joints disposed at a tip-side of the lower arm.

2. The gear transmission according to claim 1, wherein a length of the second shaft is longer than a length of the first shaft.

3. The gear transmission according to claim 1, wherein:
   the first shaft extends through a first through-hole defined in the external gear, the first through-hole extending along the central axis of the internal gear and
   a first crankshaft extends through a second through-hole defined in the external gear in parallel with the first through-hole, an eccentric body being affixed to the first crankshaft and also being disposed within the second through-hole.

4. The gear transmission according to claim 3, wherein an input gear is affixed to an end of the first crankshaft.

5. The gear transmission according to claim 4, wherein the first crankshaft is rotatably supported on the carrier.

6. The gear transmission according to claim 5, further comprising a second crankshaft rotatably supported in the carrier in parallel with the first crankshaft, wherein an eccentric body is affixed to the second crankshaft and the second crankshaft is configured to rotate passively following eccentric rotation of the external gear.

7. The gear transmission according to claim 6, wherein a third through-hole is defined in the external gear in parallel with the first and second through-holes and a portion of the carrier extends through the third through-hole.

8. The gear transmission according to claim 7, wherein the external gear is sandwiched between first and second support members of the carrier in an axial direction of the first shaft.

9. The gear transmission according to claim 1, further comprising at least one roller bearing having an inner ring contacting the first shaft and an outer ring contacting the carrier.

10. The gear transmission according to claim 1, wherein:
    the external gear and the carrier each have a central through-hole that is coaxial with the central axis,
    the external gear further has at least one additional through-hole that is disposed between the central through-hole and an outer periphery of the external gear and extends in parallel with the central through-hole,
    the carrier comprises first and second support members connected by at least one column-shaped portion,
    the first and second support members are respectively disposed on opposite axial sides of the external gear,
    the first shaft extends through the central through-hole of the external gear and the carrier, and
    the at least one column-shaped portion of the carrier extends through and fits loosely in the at least one additional through-hole in the external gear.

11. A gear transmission for driving a joint of a multi joint robot, the gear transmission comprising:
    an internal gear member having an internal gear formed on its inner circumference;
    a carrier positioned coaxially with a central axis of the internal gear and being rotatably supported on the internal gear member;
    an external gear meshing with the internal gear and being supported on the carrier in an eccentrically rotatable manner; and
    a first shaft extending through the carrier along the central axis of the internal gear and being rotatably borne on the carrier so as to be rotatable independent of the internal gear, the external gear and the carrier, the first shaft being configured to transmit a drive torque inputted by a motor at one axial end of the first shaft to its other axial end, which is configured to be coupled to an input shaft of another gear transmission, wherein:
    the first shaft extends through a first through-hole defined in the external gear and in the carrier, the first through-hole extending along the central axis of the internal gear and
    a first crankshaft extends through a second through-hole defined in the external gear and in the carrier in parallel with the first through-hole, wherein an eccentric body is affixed to the first crankshaft and is rotatably supported on an inner surface of the second through-hole, the first crankshaft being rotatable by an external drive source.

12. The gear transmission according to claim 11, further comprising a second crankshaft rotatably supported in a third through-hole defined in the external gear and in the carrier in parallel with the first crankshaft, wherein an eccentric body is affixed to the second crankshaft and the second crankshaft is configured to rotate passively following eccentric rotation of the external gear.

13. The gear transmission according to claim 11, wherein the second shaft has a length that is longer than the length of the first shaft.

14. A robot arm comprising:
a wrist having a first joint and a second joint,
a gear transmission configured to drive the first and second joints, the gear transmission comprising:
an internal gear member having an internal gear formed on its inner circumference,
a carrier positioned coaxially with a central axis of the internal gear and being rotatably supported on the internal gear member,
an external gear meshing with the internal gear and being supported on the carrier in an eccentrically rotatable manner,
a first shaft extending through the carrier along the central axis of the internal gear and being rotatably borne on the carrier so as to be rotatable independent of the internal gear, the external gear and the carrier, the first shaft being configured to transmit a drive torque inputted by a motor at one axial end of the first shaft to its other axial end, which is configured to be coupled to an input shaft of another gear transmission,
a second shaft extending through an interior of the first shaft coaxially with the first shaft,
a first gear affixed at a first end of the first shaft, and
a second gear affixed at a first end of the second shaft,
a first drive shaft detachably connected at a second end of the first shaft, the first drive shaft being mechanically coupled to drive the first joint;
a second drive shaft detachably connected at a second end of the second shaft, the second drive shaft being mechanically coupled to drive the second joint,
a first motor rotatably driving the first gear, and
a second motor rotatably driving the second gear.

15. A robot according to claim 14, wherein the first and second motors are disposed closer to the gear transmission than the first and second joints.

16. The gear transmission according to claim 14, wherein the second shaft has a length that is longer than the length of the first shaft.

17. The gear transmission according to claim 14, wherein:
the first shaft extends through a first through-hole defined in the external gear, the first through-hole extending along the central axis of the internal gear and
a first crankshaft extends through a second through-hole defined in the external gear in parallel with the first through-hole, an eccentric body being affixed to the first crankshaft and also being disposed within the second through-hole.

18. The gear transmission according to claim 17, wherein the first crankshaft is rotatably supported on the carrier.

19. The gear transmission according to claim 18, further comprising a second crankshaft rotatably supported in the carrier in parallel with the first crankshaft, wherein an eccentric body is affixed to the second crankshaft and the second crankshaft is configured to rotate passively following eccentric rotation of the external gear.

20. A gear transmission comprising:
an internal gear having radially-inward-extending gear teeth and a central axis extending in an axial direction thereof;
a carrier rotatable relative to the internal gear about the central axis;
at least a first external gear having radially-outward-extending gear teeth meshed with the internal gear, wherein a through-hole is defined in the first external gear in the axial direction and has a central axis radially displaced from the central axis of the internal gear,
a crankshaft extending through the through-hole, the crankshaft having an eccentric body affixed thereto that is rotatably supported in the through-hole and is rotatably drivable via an input gear affixed to an axial end of the crankshaft;
a first shaft extending through the carrier in parallel with the crankshaft, the first shaft being rotatably supported on the carrier and being configured to transmit a drive torque inputted at a first end to a second end thereof; and
a second shaft disposed within a hollow interior of the first shaft and being rotatably supported on an inner surface of the first shaft.

21. The gear transmission according to claim 20, wherein the second shaft has a length that is longer than the length of the first shaft.

* * * * *